(12) United States Patent      (10) Patent No.:    US 9,160,870 B2
Takamiya                                         (45) Date of Patent:      Oct. 13, 2015

(54) IMAGE PROCESSING APPARATUS FOR TRANSMITTING DATA TO A SELECTED TRANSMISSION DESTINATION, CONTROL METHOD THEREFOR AND STORAGE MEDIUM

(71) Applicant: CANON KABUSHIKI KAISHA, Tokyo (JP)

(72) Inventor: Hiroyoshi Takamiya, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 13/901,026

(22) Filed: May 23, 2013

(65) Prior Publication Data

US 2013/0329250 A1    Dec. 12, 2013

(30) Foreign Application Priority Data

Jun. 7, 2012    (JP) .................................. 2012-130191

(51) Int. Cl.
     *H04N 1/00*          (2006.01)
     *H04N 1/32*          (2006.01)

(52) U.S. Cl.
     CPC ....... *H04N 1/00389* (2013.01); *H04N 1/32058* (2013.01); *H04N 1/32096* (2013.01); *H04N 1/00411* (2013.01); *H04N 2201/0094* (2013.01)

(58) Field of Classification Search
     CPC ................................................. H04N 1/32058
     USPC .............. 358/1.15, 402, 468, 1.13, 400, 440, 358/407, 434, 435; 345/173, 671
     See application file for complete search history.

(56) References Cited

U.S. PATENT DOCUMENTS

| | | | | |
|---|---|---|---|---|
| 5,561,533 A * | 10/1996 | Yoshida | ........................ | 358/440 |
| 6,700,674 B1 * | 3/2004 | Otsuka et al. | ................ | 358/1.15 |
| 7,027,192 B2 * | 4/2006 | Kawai | ............................ | 358/402 |
| 8,446,614 B2 * | 5/2013 | Hibino et al. | ................ | 358/1.15 |
| 2002/0093690 A1 * | 7/2002 | Satoh | ........................... | 358/400 |
| 2003/0179408 A1 * | 9/2003 | Kagawa | ......................... | 358/1.18 |
| 2007/0086062 A1 | 4/2007 | Song | ............................. | 358/401 |
| 2009/0094694 A1 | 4/2009 | Kodaira | ......................... | 726/16 |
| 2010/0027058 A1 * | 2/2010 | Okada | ......................... | 358/1.15 |

FOREIGN PATENT DOCUMENTS

| | | |
|---|---|---|
| CN | 196 441 8 A | 5/2007 |
| CN | 1016 407 41 A | 2/2010 |
| JP | 06-303301 | 10/1994 |
| JP | 11-234458 A | 8/1999 |
| JP | 2006-112216 | 4/2006 |

(Continued)

OTHER PUBLICATIONS

CN Application No. 201310224959.9—Office Action dated May 11, 2015.

*Primary Examiner* — Allen H Nguyen
(74) *Attorney, Agent, or Firm* — Fitzpatrick, Cella, Harper & Scinto

(57) ABSTRACT

An image processing apparatus of this invention selects, as a destination to be used for data transmission, a destination stored in advance. If the destination has been selected by a first selection method, the apparatus executes the data transmission after displaying on a display unit a confirmation screen for the user to confirm the selected destination. If the destination has been selected by a second selection method, the apparatus executes the data transmission without displaying the confirmation screen on the display unit.

9 Claims, 8 Drawing Sheets

(56) References Cited

FOREIGN PATENT DOCUMENTS

| | | |
|---|---|---|
| JP | 2008-112216 A | 5/2008 |
| JP | 2009-094709 A | 4/2009 |
| JP | 2010-034843 A | 2/2010 |
| JP | 2010-199801 A | 9/2010 |
| JP | 2011-250375 A | 12/2011 |

\* cited by examiner

F I G. 7
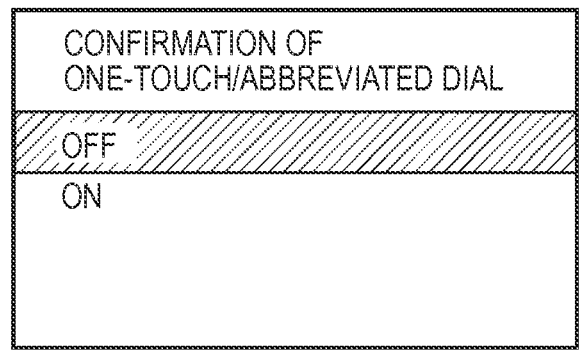

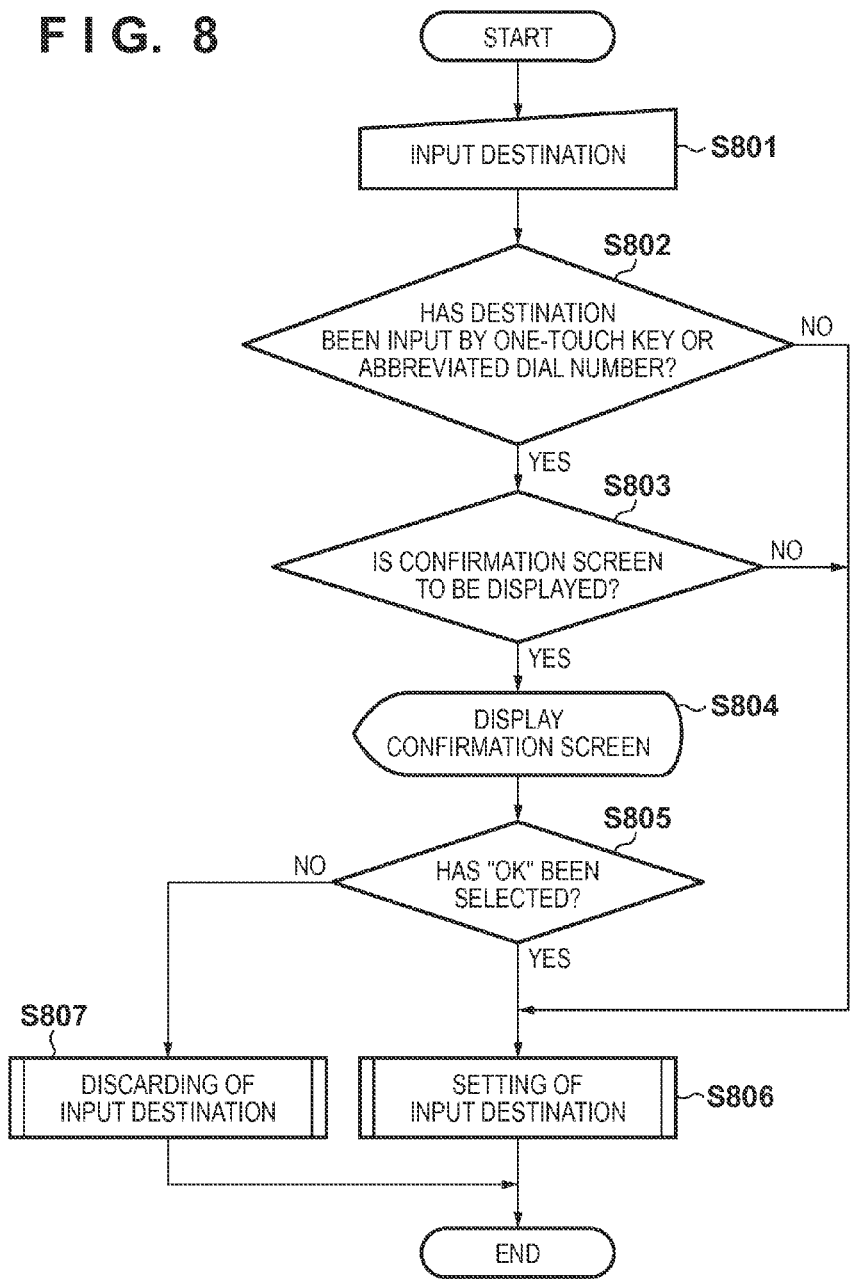

IMAGE PROCESSING APPARATUS FOR TRANSMITTING DATA TO A SELECTED TRANSMISSION DESTINATION, CONTROL METHOD THEREFOR AND STORAGE MEDIUM

BACKGROUND OF THE INVENTION

1. Field of the Invention

The present invention relates to an image processing apparatus, a control method therefor, and a storage medium.

2. Description of the Related Art

Recently in the field of compact image processing apparatuses, further downsizing and functional advances are required in addition to cost reduction. Furthermore, along with prevalence of networks, it is becoming a common practice for an image processing apparatus to have a facsimile transmission function, or a function of transmitting data to an external apparatus.

One-touch key dialing in which a transmission destination is assigned to a specific hard key or abbreviated dialing in which a transmission destination is assigned to a specific number of several digits is used as a method of readily designating a transmission destination before transmission processing. Moreover, an address book which enables to select, from a list, a transmission destination assigned to a one-touch key or abbreviated dial number has been implemented.

The one-touch key dialing and abbreviated dialing facilitate an input operation. It is, however, difficult to readily confirm a key or number assigned with a desired transmission destination, and thus a one-touch key may be erroneously pressed or a wrong abbreviated dial number may be selected, resulting in wrong transmission. To the contrary, designation of a transmission destination from an address book enables to instruct a transmission destination after confirming contents, thereby reducing the probability of wrong transmission. Although it is possible to readily confirm contents, the operation is cumbersome since an instruction is given while sequentially confirming the contents of a list. To solve this problem, Japanese Patent Laid-Open No. 06-303301 proposes an image transmission apparatus provided with a display unit for displaying a transmission destination assigned to a one-touch key.

The above conventional technique, however, has the following problem. For example, the above conventional technique enables to readily confirm a transmission destination assigned to a one-touch key. If, therefore, the user carefully confirms contents before selecting a transmission destination, and reconfirms, after designating the selected transmission destination, whether it is correct, no wrong transmission occurs. Since, however, the designated transmission destination is directly used, wrong transmission due to erroneous press of a key or selection of a wrong number cannot be eliminated yet.

SUMMARY OF THE INVENTION

The present invention enables realization of a mechanism of preventing an input error by displaying, upon accepting a destination input by a specific simplified operation such as press of a one-touch key or input of an abbreviated dial number, contents of a destination on a screen to prompt the user to confirm the destination while preventing the operation from becoming cumbersome without reconfirming a number when accepting another simplified operation.

One aspect of the present invention provides an image processing apparatus comprising: a selection unit configured to select, as a destination to be used for data transmission, a destination stored in advance; and a control unit configured to execute, if the selection unit has selected the destination by a first selection method, the data transmission after displaying on a display unit a confirmation screen for a user to confirm the selected destination, and execute, if the selection unit has selected the destination by a second selection method, the data transmission without displaying the confirmation screen on the display unit.

Another aspect of the present invention provides an image processing apparatus comprising: a selection unit configured to select, as a destination to be used for data transmission, a destination stored in advance; and a control unit configured to execute, if the selection unit has selected the destination by a first selection method, the data transmission after accepting a user operation indicating that the selected destination has been confirmed, and execute, if the selection unit has selected the destination by a second selection method, the data transmission without accepting a user operation indicating that the selected destination has been confirmed.

Still another aspect of the present invention provides a control method for an image processing apparatus, comprising: selecting, as a destination to be used for data transmission, a destination stored in advance; and executing, if the destination has been selected by a first selection method in the selecting, the data transmission after displaying on a display unit a confirmation screen for a user to confirm the selected destination, and executing, if the destination has been selected by a second selection method in the selecting, the data transmission without displaying the confirmation screen on the display unit.

Yet still another aspect of the present invention provides a control method for an image processing apparatus, comprising: selecting, as a destination to be used for data transmission, a destination stored in advance; and executing, if the destination has been selected by a first selection method in the selecting, the data transmission after accepting a user operation indicating that the selected destination has been confirmed, and executing, if the destination has been selected by a second selection method in the selecting, the data transmission without accepting a user operation indicating that the selected destination has been confirmed.

Still yet another aspect of the present invention provides a non-transitory computer-readable storage medium storing a computer program for controlling a computer to execute respective steps in a control method of the image processing apparatus.

Further features of the present invention will become apparent from the following description of exemplary embodiments with reference to the attached drawings.

BRIEF DESCRIPTION OF THE DRAWINGS

FIG. 7 is a view showing a screen for setting enabling/disabling of display of an input destination confirmation screen according to the second embodiment; and FIG. 8 is a flowchart illustrating processing including display/non-display of the input destination confirmation screen according to the second embodiment.

DESCRIPTION OF THE EMBODIMENTS

Figure 1:
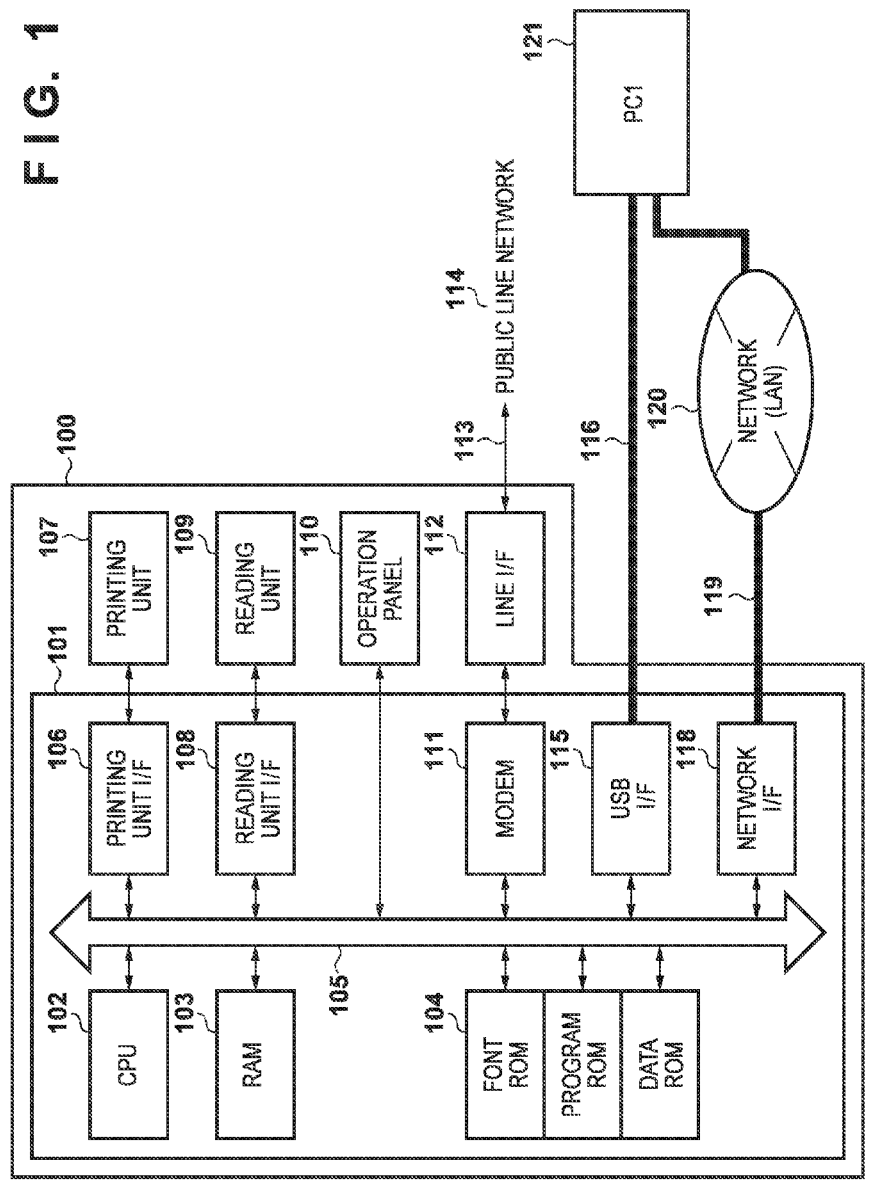
FIG. 1 is a block diagram showing the arrangement of an image processing apparatus according to the first embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>
<Arrangement of Image Processing Apparatus>

The first embodiment will be described below with reference to FIGS. 1 to 6. The hardware arrangement of an image processing apparatus 100 according to this embodiment will first be explained with reference to FIG. 1. Each block represents a module, and an arrow between blocks indicates a flow of data or an instruction.

The image processing apparatus 100 includes a printing unit 107, a reading unit 109, an operation panel 110, a line I/F 112, and a controller unit 101 for controlling the above components. The controller unit 101 includes a CPU 102, a RAM 103, a ROM 104, a printing unit I/F 106, a reading unit I/F 108, a MODEM (modem) 111, a USB I/F 115, and a network I/F 118. The respective blocks are connected with each other by a system bus 105. Although the reading unit 109 and printing unit 107 are provided within the image processing apparatus 100 in the block diagram, one or both of the units may be externally provided.

The CPU 102 comprehensively controls the respective blocks by executing various control programs. More specifically, the CPU 102 controls the respective blocks by loading various control programs stored in the ROM 104 into the RAM 103, and executing them. The various control programs may be stored in a hard disk drive (HDD) (not shown) in a compressed/uncompressed state.

The network I/F 118 performs communication processing with a host computer 121 (represented by a PC in FIG. 1, and to be referred to as a PC hereinafter) via a network (LAN) 120 or the like. The network I/F 118 and network 120 are connected to each other by a communication cable such as a LAN cable 119. The modem 111 is connected to a public line network 114 via the line I/F 112, and performs communication processing with other image processing apparatuses, facsimile apparatuses, and telephones (none are shown). The line I/F 112 and public line network 114 are connected to each other by generally a telephone line 113 or the like.

The printing unit I/F 106 is an interface for outputting an image signal to the printing unit 107 (a printer engine). The reading unit I/F 108 is an interface for inputting a read image signal from the reading unit 109 (a scanner engine). The CPU 102 processes the image signal input from the reading unit 109, and then outputs it as a recording image signal to the printing unit I/F 106.

Using font information stored in the font area of the ROM 104, the CPU 102 displays texts and symbols on the display unit of the operation panel 110, and receives instruction information from the operation panel 110 which has received a user instruction. The CPU 102 stores the device information of the image processing apparatus 100, user telephone book information, department management information, and the like in the data area of the ROM 104, reads them out as needed, and updates them as needed.

<Operation Panel>

The operation panel 110 of the image processing apparatus 100 according to this embodiment will be described with reference to FIG. 2. The image processing apparatus 100 according to this embodiment has a copy function by the reading unit 109 and printing unit 107, a scan function by the reading unit 109 and USB I/F 115, and the like. The image processing apparatus 100 also has a facsimile function by the modem 111, and a function of performing printing instructed by the PC 121 via a USB (Universal Serial Bus) 116 or the network 120. The operation panel 110 functions as an acceptance unit for accepting a user input.

Figure 2:
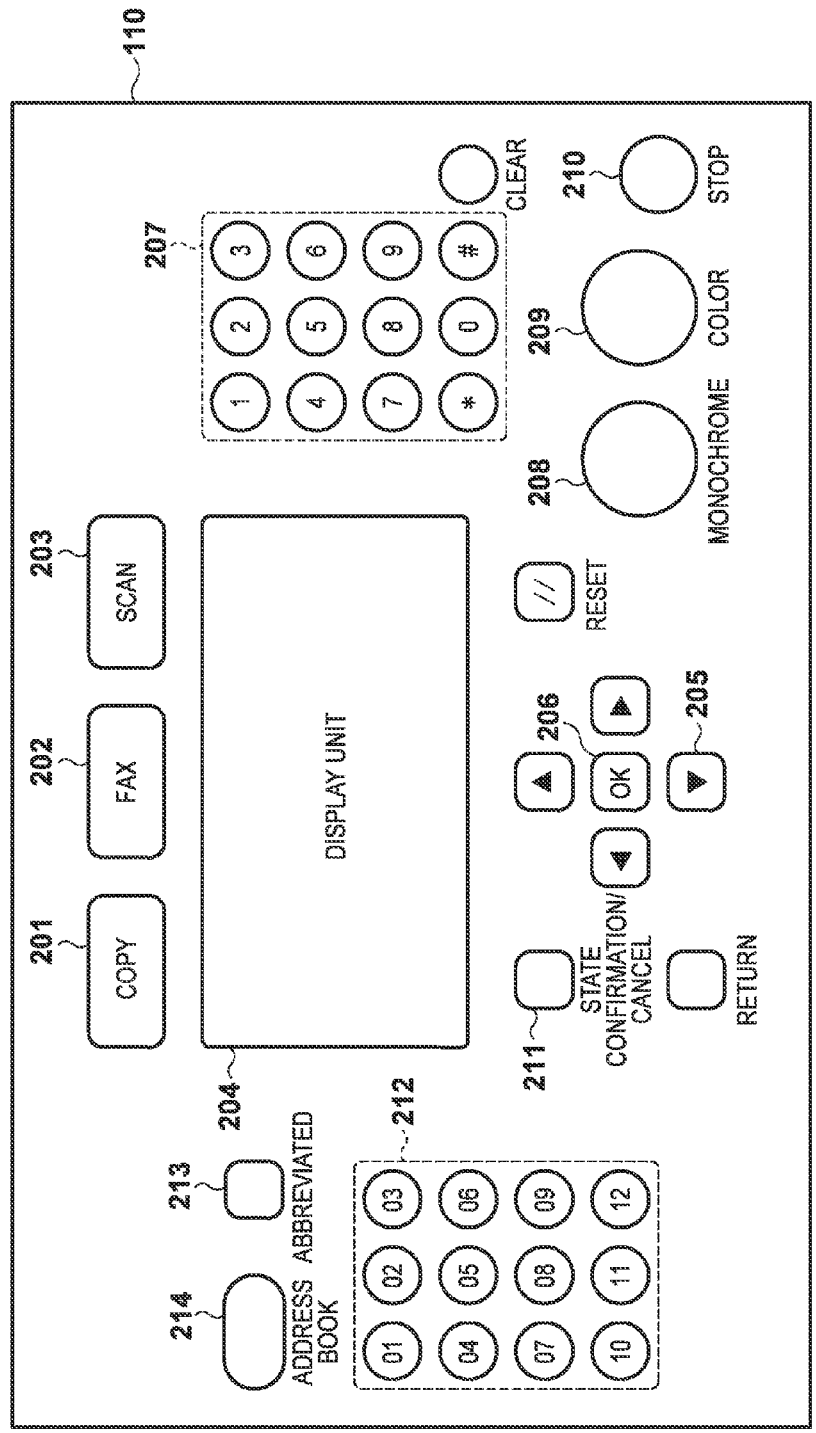
FIG. 2 is a view showing an operation panel according to the first embodiment.

As shown in FIG. 2, function keys 201 to 203 for selecting the above-described functions are arranged on the operation panel 110. The user presses a button for a function he/she wants to use. The operation panel 110 also includes a display unit 204 for notifying the user of a setting state and the device state of the image processing apparatus 100. A 4-way selector 205 is used to move a cursor and the like displayed on the display unit 204. The 4-way selector 205 includes four buttons: up, down, left, and right buttons. An OK key 206 is arranged in the center of the 4-way selector. The OK key 206 has the function of an "enter key" for a setting or a query.

To input, for example, the number of copies or a telephone number in the facsimile function, the user uses a ten-key pad 207. The operation panel 110 also includes a monochrome start key 208 and a color start key 209 each serving as a key to instruct the start of copy, scan, or facsimile. The image processing apparatus 100 having a function of determining, upon reading a document, whether the document is color or monochrome may not have the individual start keys shown in FIG. 2.

A stop key 210 instructs to stop the operation of each function. On the other hand, the user can stop an operation by selecting, using a state confirmation/cancel key 211, processing to be stopped through the state confirmation screen for displaying processes which are currently executed in the image processing apparatus 100. In this case as well, the selection and decision are done using the above-described 4-way selector 205 and OK key 206.

One-touch keys 212, an abbreviated key 213, and an address book key 214 are provided as a method of readily designating a destination for facsimile or transmission. The one-touch keys 212 include a plurality of numeric keys, in each of which one destination has been registered. The user can designate a destination by pressing a desired button once. In abbreviated dialing, a screen for prompting the user to input a number is displayed when the abbreviated key 213 is pressed, and the user uses the ten-key pad 207 to input an abbreviated number assigned to a desired destination, thereby designating the destination. When the address book key 214 is pressed, a list of destinations registered in the image processing apparatus 100 is displayed. In this state, the user can decide a desired destination by selecting the destination using the 4-way selector 205, and pressing the OK key 206. Note that although the one-touch keys 212, abbreviated key 213, and address book key 214 have been explained as hardware keys, the present invention is not limited to this, and these keys may be implemented as software keys selectively displayed on the touch panel display unit 204. An operation of readily inputting a destination using the one-touch key 212, abbreviated key 213, or address book key 214 will be referred to as a simplified operation hereinafter.

<Simplified Operation>

Figure 3:
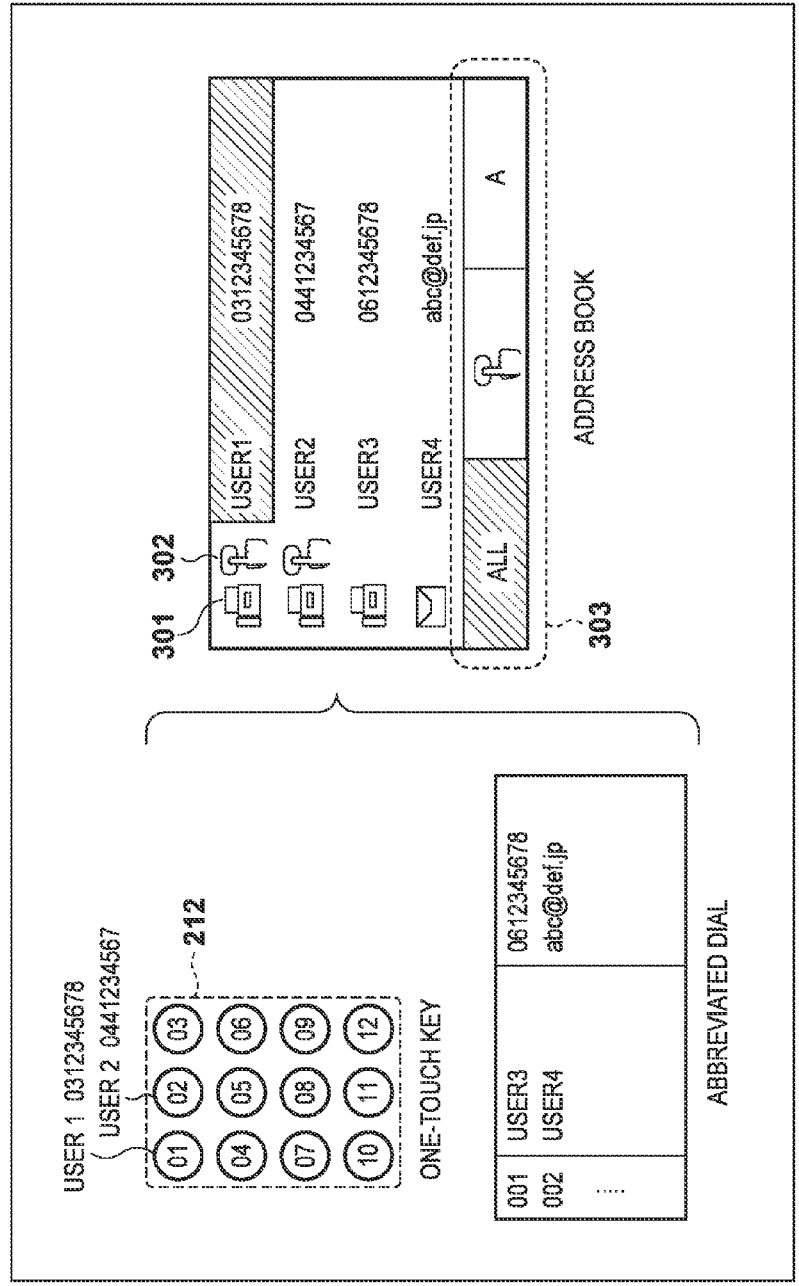
FIG. 3 is a view showing the association between an address book and one-touch keys/abbreviated dial numbers according to the first embodiment.

A simplified operation using the one-touch key 212, abbreviated key 213, or address book key 214 according to this embodiment will be described with reference to FIG. 3. As shown in FIG. 3, among the one-touch keys 212, a key "01" is assigned with user 1, and a key "02" is assigned with user 2. Furthermore, an abbreviated dial number 001 is assigned with user 3, and an abbreviated dial number 002 is assigned with user 4. To designate an abbreviated dial number, the abbreviated key 213 is pressed, and then a registered number is input using the ten-key pad 207. It is also possible to refer to and use, from the address book, the destinations registered in the one-touch keys 212 and abbreviated key 213.

The address book is displayed on the display unit 204 when the address book key 214 is pressed. An icon 301 indicates a protocol for a corresponding registered destination. In the example shown in FIG. 3, facsimile numbers are registered for users 1 to 3, and an e-mail address is registered for user 4. An icon 302 indicates whether a corresponding registered destination has been assigned to one of the one-touch keys 212. In FIG. 3, each of users 1 and 2 has been assigned to one of the one-touch keys 212. Tabs 303 enable to switch items displayed in the address book. In FIG. 3, tabs "all", "one-touch keys", and "destinations starting with "A"" are displayed. For the destinations and tabs, a currently selected item is highlighted. Referring to FIG. 3, since the tab "all" is highlighted, all the destinations registered in the address book are displayed. Note that if not all destinations can be displayed due to the limited display area of the display unit 204, scroll display may be performed by displaying a scroll button or the like.

<Screen Transition>

Screen transition when a simplified operation is performed according to this embodiment will be described with reference to FIGS. 4 and 5. A screen 401 is a facsimile basic screen, and is displayed to stand by for a destination input. If a destination is designated using the one-touch key 212 or abbreviated key 213 in the screen, a confirmation screen 402 showing contents of the input one-touch key 212 is displayed to prompt the user to confirm the contents.

Figure 4:
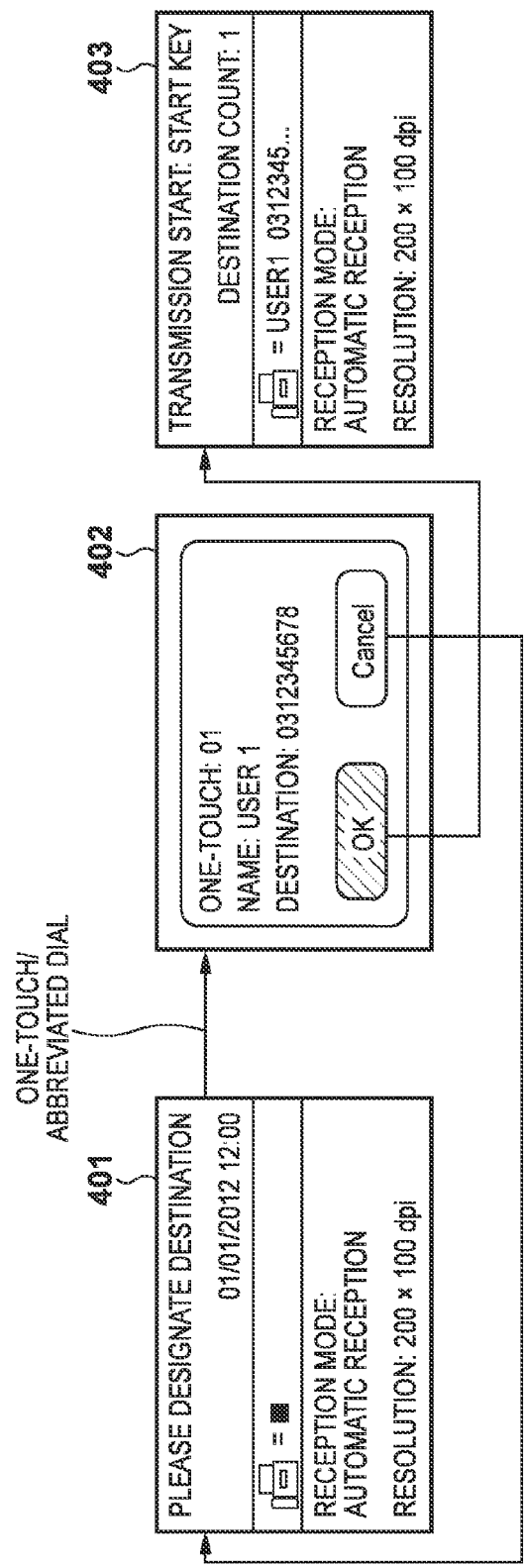
FIG. 4 is a view showing a screen flow when designating a destination using a one-touch key/abbreviated dial number according to the first embodiment.
Figure 5:
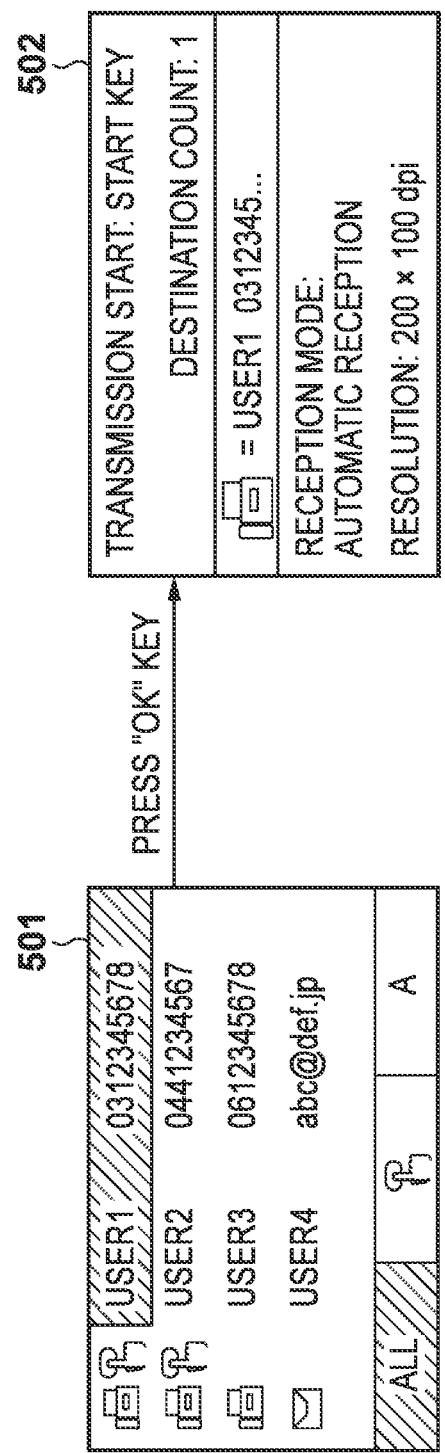
FIG. 5 is a view showing a screen flow when designating a destination using the address book according to the first embodiment.

As shown in FIG. 4, the confirmation screen 402 displays an executed simplified operation, for example, information (the type of simplified operation) indicating that the one-touch key "01" has been pressed. The confirmation screen 402 also displays the user name of the destination and a destination address (contents of the destination) registered in the one-touch key "01", an OK button, and a Cancel button. If "OK" is selected on the confirmation screen 402, the screen transits to a facsimile screen 403 for which the destination has been designated. If "Cancel" is selected on the confirmation screen 402, the screen returns to the screen 401 without designating the destination.

The screen 403 displays a start key for starting transmission, the number of destinations currently designated, simplified display of a destination such as a protocol, name, and destination address, a current reception mode, and a resolution in reception. That is, in this embodiment, even if a one-touch key is pressed, it is possible to prompt the user to finally confirm a destination by displaying the confirmation screen 402 instead of immediately performing transmission in the screen 401. If the user adopts the destination confirmed through the confirmation screen 402, he/she can select "OK" to advance to transmission processing; otherwise, he/she can select "Cancel" to prevent advancing to transmission processing.

Screen transition when a destination is designated from the address book will be described with reference to FIG. 5. A screen 501 displays a list of the destinations registered in the address book. The user designates a destination by moving a focus using the 4-way selector 205, and pressing the OK key 206. Assume that a destination is designated from the address book. In this case, since a destination to be selected is displayed on the screen 501, even if the destination is assigned to the one-touch key 212, the screen transits to a transmission screen 502 without displaying the confirmation screen 402. That is, according to this embodiment, when performing a simplified operation using the address book, the user can confirm a destination on the screen 501, and thus the transmission screen is displayed while starting transmission, unlike a case in which the one-touch key 212 is pressed. According to this embodiment, simplified operations are controlled by separating them into a first type as a confirmation operation which requires confirmation of a destination through a confirmation screen and a second type which does not require display of a confirmation screen. For example, the first type includes a simplified operation using the one-touch key 212 or abbreviated key 213, and the second type includes a simplified operation using the address book key 214.

<Processing Procedure>

Figure 6:
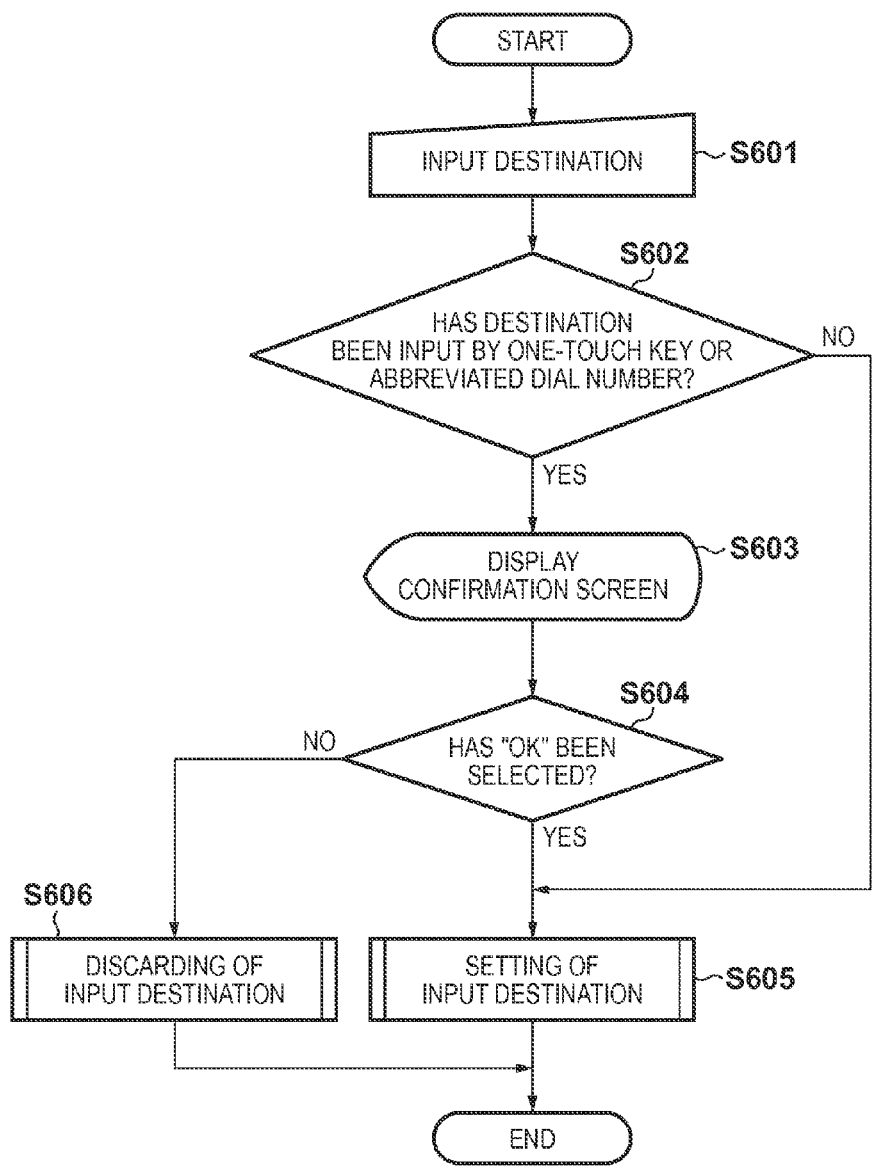
FIG. 6 is a flowchart illustrating input destination confirmation screen display processing according to the first embodiment.

A processing procedure of displaying the input destination confirmation screen according to this embodiment will be described with reference to FIG. 6. The processing to be explained below is implemented when, for example, the CPU 102 loads a control program stored in the ROM 104 or the HDD into the RAM 103, and executes it.

In step S601, the user inputs a destination through the operation panel 110. In step S602, the CPU 102 determines whether the destination input method is a method using the one-touch key 212 or abbreviated key 213. That is, the type of simplified operation performed by the user is determined. If the destination has been input not using the one-touch key 212 or abbreviated key 213, the CPU 102 advances the process to step S605 to set the input destination as a transmission destination, thereby terminating the process. For example, if the accepted simplified operation has been performed by operating the address book key 214, it is considered that the user has already confirmed the destination so transmission setting processing is executed without performing confirmation processing, thereby advancing to transmission processing.

On the other hand, if it is determined in step S602 that the simplified operation has been performed using the one-touch key 212 or abbreviated key 213, the process advances to step S603, and the CPU 102 displays the confirmation screen 402 on the display unit 204. In step S604, the CPU 102 determines whether the user has selected "OK" on the confirmation screen 402. If the user has selected "OK", the process advances to step S605 and the CPU 102 sets the input destination as a transmission destination, thereby terminating the process.

On the other hand, if it is determined in step S604 that the user has selected "Cancel", the process advances to step S606 and the CPU 102 discards the input destination, thereby terminating the process. That is, it is determined that the user has erroneously input the destination, and the process ends without performing transmission setting processing.

As described above, according to this embodiment, if a simplified operation has been performed using a one-touch key or abbreviated key to select a destination, the number of the instructed one-touch key or abbreviated key is displayed on the confirmation screen to prompt the user to confirm the destination, thereby preventing an input error. On the other hand, if a destination is instructed from the address book, no confirmation screen is displayed to confirm the number, thereby preventing the operation from becoming cumbersome. With this arrangement, the image processing apparatus according to this embodiment can preferably prompt the user to confirm a destination according to the type of simplified operation.

<Second Embodiment>

The second embodiment of the present invention will be described below with reference to FIGS. 7 and 8. In the above first embodiment, whenever a simplified operation using a one-touch key or abbreviated key is performed, the confirmation screen is always displayed. In this embodiment, an arrangement will be described in which it is possible to select display or non-display of a confirmation screen by making a setting, instead of always displaying the confirmation screen whenever a simplified operation is performed as described above.

<Setting Screen>

A setting screen for setting enabling/disabling of display of an input destination confirmation screen according to this embodiment will be described with reference to FIG. 7. When OFF is selected in FIG. 7, no input destination confirmation screen 402 is displayed even if a simplified operation is a destination input using a one-touch key 212 or abbreviated key 213. On the other hand, when ON is selected, the input destination confirmation screen 402 is displayed if a simplified operation is a destination input using the one-touch key 212 or abbreviated key 213. Note that it is desirable to make a setting through the setting screen before actually executing facsimile or transmission processing.

<Processing Procedure>

A processing procedure of displaying the confirmation screen when display/non-display of the input destination confirmation screen is set according to this embodiment will be described with reference to FIG. 8. The processing to be explained below is implemented when, for example, a CPU 102 loads a control program stored in a ROM 104 or an HDD into a RAM 103, and executes it.

In step S801, the user inputs a destination through an operation panel 110. In step S802, the CPU 102 determines whether the destination input method is a method using the one-touch key 212 or abbreviated key 213. That is, the type of simplified operation performed by the user is determined. If the destination has not been input using the one-touch key 212 or abbreviated key 213, the CPU 102 sets the input destination as a transmission destination in step S806, thereby terminating the process. For example, if the accepted simplified operation has been performed by operating an address book key 214, it is considered that the user has already confirmed the destination so transmission setting processing is executed without performing confirmation processing, thereby advancing to transmission processing.

On the other hand, if it is determined in step S802 that the simplified operation has been performed using the one-touch key 212 or abbreviated key 213, the process advances to step S803, and the CPU 102 determines whether the current setting is a setting to display the confirmation screen 402. If a setting has been made to display the input destination confirmation screen 402, the process advances to step S804, and the CPU 102 displays the confirmation screen 402 on a display unit 204. If it is determined in step S805 that the user has selected "OK", the process advances to step S806 and the CPU 102 sets the input destination as a transmission destination, thereby terminating the process.

On the other hand, if it is determined in step S805 that the user has selected "Cancel", the process advances to step S807 and the CPU 102 discards the input destination, thereby terminating the process. Alternatively, if it is determined in step S803 that a setting has been made not to display the input destination confirmation screen 402, the process advances to step S806 without displaying the confirmation screen, and the CPU 102 sets the input destination as a transmission destination, thereby terminating the process.

As described above, according to this embodiment, in addition to the arrangement of the above first embodiment, it is possible to set to display or not to display a confirmation screen for a dial number input by a one-touch key or abbreviated key in accordance with user's need.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-130191 filed on Jun. 7, 2012, which is hereby incorporated by reference herein in its entirety.

What is claimed is:

1. An image processing apparatus comprising:
a specifying unit configured to specify destination data which is selected by a user with a first selection method or with a second selection method, from among plural items of destination data which have been stored in advance, wherein destination data is selected while information indicating a destination is not provided to the user with the first selection method or destination data is selected while information indicating a destination is provided to the user with the second selection method;
a setting unit configured to set, if the specified destination data has been selected with the first selection method, a transmission destination based on the specified destination data after accepting a user operation through a confirmation screen, displayed on a display unit, which includes information indicating a destination corresponding to the specified destination data, and set, if the specified destination data has been selected with the second selection method, a transmission destination based on the specified destination data without displaying the confirmation screen on the display unit; and
a transmission unit configured to transmit data to the transmission destination set by said setting unit.

2. The apparatus according to claim 1, wherein said setting unit, if a cancel instruction is accepted from the user through the confirmation screen, does not perform a setting of the transmission destination.

3. The apparatus according to claim 1, wherein, in the first selection method, destination data is selected using a one-touch key or an abbreviated key.

4. The apparatus according to claim 1, wherein, in the second selection method, destination data is selected using an address book.

5. The apparatus according to claim 1, further comprising a second setting unit configured to set whether to display the confirmation screen,
wherein if said second setting unit has been made not to display the confirmation screen, said setting unit sets the specified destination data as the transmission destination without displaying the confirmation screen on the display unit even though the specified destination data has been selected with the second selection method.

6. A non-transitory computer-readable storage medium storing a computer program for controlling a computer to execute respective steps in a control method of an image processing apparatus of claim 1.

7. The apparatus according to claim 1, wherein the information indicating the destination is facsimile numbers.

8. The apparatus according to claim 1, wherein same destination data can be selected with the first selection method or with the second selection method.

9. A control method for an image processing apparatus, comprising:
   specifying destination data which is selected by a user with a first selection method or with a second selection method, from among plural items of destination data which have been stored in advance, wherein destination data is selected while information indicating a destination is not provided to the user with the first selection method or destination data is selected while information indicating a destination is provided to the user with the second selection method;
setting, if the specified destination data has been selected with the first selection method in the selecting, a transmission destination based on the specified destination data after accepting a user operation through a confirmation screen, displayed on a display unit, which includes information indicating a destination corresponding to the specified destination data, and setting, if the specified destination data has been selected with a second selection method in the selecting, a transmission destination based on the selected destination data without displaying the confirmation screen on the display unit; and
transmitting data to the set transmission destination.

* * * * *